United States Patent Office 2,753,284
Patented July 3, 1956

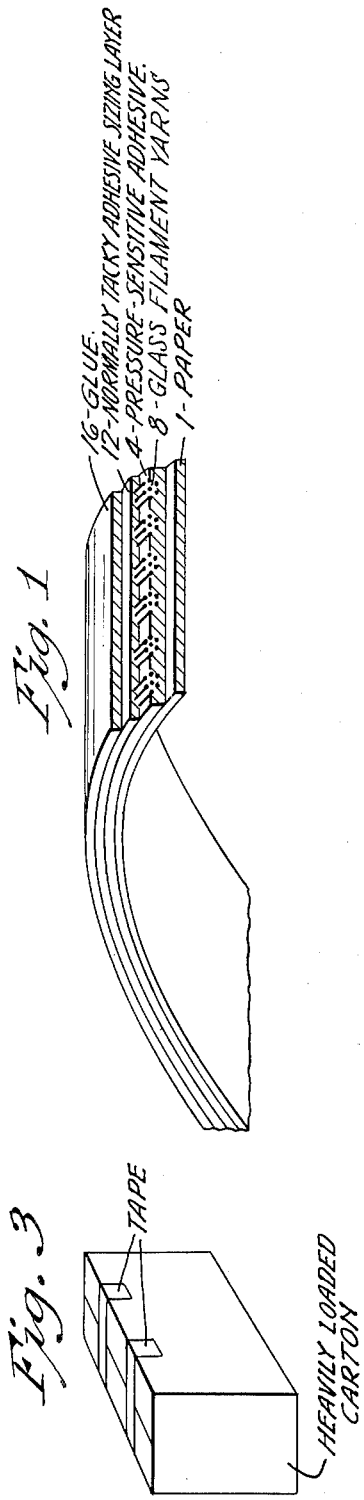

2,753,284

HIGH TENSILE STRENGTH GUMMED FILAMENT TAPE

Walter H. Pahl, Western Springs, and Willis A. Sandholtz, Brookfield, Ill., assignors to Minnesota Mining & Manufacturing Company, St. Paul, Minn., a corporation of Delaware Application March 23, 1954, Serial No. 418,124

1 Claim. (Cl. 154—53.5)

This invention relates to lineally reinforced adhesive tape.

Prior constructions of this broad class have included the addition to the normal combination of backing and adhesive, of a plurality of elongate members or elements (such as threads, strands or fibers) to increase the tensile strength, such elements being in or on the backing, in or on the adhesive, or between the adhesive and the backing.

Such prior constructions however, have been unsatisfactory in many ways. For example, although possessing a tensile strength greater than that of unreinforced tape, their capacities in this respect are still relatively limited and none of them possesses what could be regarded as high tensile strength, particularly a high tensile strength resistant to sudden and severe shock stresses.

An objective of this invention is to provide a lineally reinforced gummed paper tape having a high tensile strength, i. e., a tensile strength of at least 100 pounds per inch width, and of otherwise improved construction and performance.

More recently, certain species of high tensile strength gummed tapes, sometimes referred to as "strapping tapes," have been developed and are described and claimed in Patents Nos. 2,674,555–6 which issued April 6, 1954, on the copending applications of Walter H. Pahl, Keith H. Williams and Hubert J. Tierney Serial Nos. 180,045–6, filed August 17, 1950. These tapes have a backing (coated with glue or the like) which is a laminated structure of two sheets of paper adhered to each other by a layer of rubber-resin type normally tacky pressure-sensitive adhesive, with a non-woven layer of lineally aligned continuous mono-fiber hair-like organo-synthetic textile filaments or glass filaments embedded within the adhesive layer. The glue is applied to the outer exposed surface of one of the two sheets of paper. These constructions of high tensile strength gummed filament tape are sometimes referred to as "sandwich" constructions.

In contrast, the high tensile strength gummed filament tape of the present invention requires but a single sheet of paper, and the glue or "gum" or other normally non-tacky adhesive is applied, not to paper, but to an exposed tacky surface of a layer of normally tacky adhesive.

It comprises a sheet of paper, a layer of a rubber-resin type pressure-sensitive adhesive which is waterproof and is stably and normally tacky, a layer of a second normally tacky adhesive over the first layer of tacky adhesive, with a non-woven layer of lineally aligned continuous mono-fiber hair-like glass filaments between the two tacky adhesive layers, embedded therein and unified therewith. The glue is applied directly onto the exposed tacky surface of the said second layer of normally tacky adhesive.

In constructing this new form of gummed strapping tape, the first layer of tacky adhesive is applied to the paper, the filament layer is then applied, and thereafter the second layer of tacky adhesive which is usually but not necessarily of a composition different from that of the first layer, is applied to the exposed surface of the filament layer. The glue is then applied to the exposed tacky surface of the second layer of tacky adhesive.

The second layer of tacky adhesive is sometimes referred to as a sizing layer. We find the use of a sizing layer superior to coating the glue directly onto the filament layer, the latter construction being lacking in desirable performance characteristics of the present construction.

The filaments may be single or in yarns.

An illustrative embodiment is described below and illustrated in the accompanying drawings in which:

Figure 1 is a schematic diagram showing in perspective a length of the tape;

Figure 2 shows a method and apparatus for its making; and

Figure 3 shows a carton bound or "strapped" with the tape of Figure 1.

A sheet 1 of 60 pound kraft paper (kraft paper having a ream weight of 60 pounds per 3000 square feet) is led from a supply roll 2 thereof through a coating apparatus 3 where a layer of a stably and normally tacky pressure-sensitive adhesive 4 of the rubber-resin type that is commonly used as the adhesive layer in pressure-sensitive adhesive tapes, is applied. Thereafter it passes through a drying oven 5 and thence between two laminating rollers 6 and 7 where a layer of continuous filament yarns 8 is applied to the adhesive side.

The yarns are drawn from a warp beam 9 to combs 10 and thence to the laminating rollers 6 and 7 where, in going through the nip, they are pressed into the surface of the soft, dried coating of adhesive 4 to form a lineally aligned mono-layer of continuous yarns 8 that are held in place by and embedded in the adhesive.

The laminated sheeting then proceeds horizontally, yarn side up, to a second coating apparatus 11 which applies a sizing layer of normally tacky adhesive 12 to the yarn side of the sheeting.

After next passing through a second drying oven 14, the laminated sheeting then is passed through a gumming apparatus 15 where a layer of high strength glue 16 is coated onto the exposed tacky surface of the sizing layer 12 in such a manner and quantity as to obtain a smooth and continuous glue film surface. Thereafter, it passes through a drying oven 17.

This completes the laminated structure shown in Figure 1.

The finished product is wound up in a storage roll 18.

Other high strength, friable, normally non-tacky adhesives, such as water-activatable or heat-activatable adhesives, may be used in place of the glue 16.

The weight of the paper may vary, also the kind. Creped paper, for example, may be employed.

The yarns 8 that form the filament layer have a loose twist, about one twist per inch. They are close together in shoulder to shoulder relation, and form a mono-layer, that is, a layer having a thickness of one yarn. When the filament layer is formed of loose untwisted filaments instead of the twisted yarns, it is of substantially the same thickness as the mono-layer of yarns.

A layer of 100 yarns per inch of 150 1/0, 204 filament yarn glass will produce tape having a tensile strength of more than 400 pounds per inch width.

Glass filaments of other sizes and count may be employed.

Each filament is a continuous, smooth-surfaced, cylindrical mono-fiber extending without break from one end of the tape to the other (although a small number of the total filaments in any actual tape may be found to have become broken since ideal manufacturing conditions are not required). They are to be distinguished from the common filaments, yarns and threads of the textile industry, which are formed by spinning natural fibers or which are formed by spinning staple fibers that have previously been made by chopping continuous synthetic filaments into fibers capable of being carded and spun in a manner analogous to the handling of cotton fibers.

The adhesive 4 is one of the various rubber-resin type normally tacky pressure-sensitive adhesives of the type well known in the art as suitable for the adhesive coating on pressure-sensitive adhesive tapes; and such adhesives are the ones meant herein by the expression "rubber-resin type of pressure-sensitive adhesive." These adhesives are water-insoluble and aggressively tacky. They have a rubbery base of natural or synthetic rubber which provides cohesion (internal strength) and elasticity (a retractive force when stretched and retraction when released after stretching); and this rubber base is modified by blending with a compatible tackifier resin (such as rosin or ester gum) which serves to increase adhesion (tackiness) and decrease cohesion, with an attendant increase of stretchiness (elongation under low stresses) and decrease of elasticity.

These rubber-resin tape adhesives have a proper four-fold balance of adhesion, cohesion, stretchiness and elasticity. They are termed "eucohesive" by which it is meant that they are more cohesive than adhesive.

Certain synthetic polymers are inherently tacky and eucohesive and possess the above-mentioned four-fold balance of properties, and can be used as pressure-sensitive tape adhesives, thus being equivalents of the rubber-resin adhesives. Hence they are regarded as being included in the adhesives embraced by the expression "rubber-resin type pressure-sensitive adhesive." An example is a 75:25 copolymer of 2-ethyl-butyl-acrylate and ethyl acrylate.

If desired, the above described rubber-resin type pressure-sensitive adhesives may be used as the second or sizing layer 12 as well as for the first layer 4, and this will enhance the combinative effect of the filaments and the contacting adhesive in a manner hereinafter pointed out.

However, satisfactory performance characteristics may be attained and a substantial cost saving will be gained by employing as the sizing layer 12 a normally tacky water-dispersed adhesive.

Water-dispersed adhesives are cheaper than solvent-dispersed adhesives. Also where water-dispersed adhesives are thus employed, the drying oven 14 may be omitted.

Although it is sufficient that the water-dispersed adhesive used as the sizing layer 12 be simply normally tacky, it is preferable that it have good adhesion for the filaments, for the adhesive 4 and for the glue 16, and that it also possess a cohesive strength at least as great as its said adhesive strength. It is further preferable that it possess, at least to a noticeable degree, the qualities of stretch and elasticity.

Thus a preferred example of a water-dispersed adhesive for the sizing layer 12 is as follows:

| | Parts by weight |
|---|---|
| Coumarone-indene resin (M. P. 50° C.) | 8 |
| Coumarone-indene resin (M. P. 25° C.) | 6 |
| Rosin soap | 2 |
| Rubbery butadiene-styrene copolymer solids with about 0.07 part of rubber antioxidant added | 7 |
| Water sufficient to form an emulsion of 55 to 60% solids. | |

The copolymer is 44 to 48% styrene, and is used in the form of a 39 to 42% solids content latex. A commercial example of this is "GRS latex 2000."

In making the adhesive, the rosin soap is formed in situ from wood rosin and a 50% aqueous solution of potassium hydroxide. The low melting resin is heated to facilitate handling. The resins, the rosin and the antioxidant are slowly mixed in a jacketed heavy duty internal mixer heated with steam at 25 pounds per square inch in the jacket, until uniform. The temperature of the mass is then reduced by running cooling water through the jacket until it is below 200° F., whereupon the potassium hydroxide solution is added, the mixer being idle during the addition. Slow mixing is then resumed. The copolymer latex is slowly added when the temperature is below 160° F. Thereafter the mixture is diluted with water.

Such an adhesive has good adhesion for the filaments 8, for the glue 16 and for the underlayer of pressure-sensitive adhesive 4, and cohesion at least as great as the said adhesion. The rubber content supplies a noticeable degree of stretch and elasticity.

Considering now the laminate 1—4—8 (the paper 1, the layer 4 of the rubber-resin type pressure-sensitive adhesive and the layer of filaments or yarns 8), the layer of filaments or yarns 8 is pressed into the adhesive layer 4 when the laminate passes through the nip of the rollers 6 and 7, causing penetration of the adhesive 4 into the filament layer. A still further penetration is caused by capillary attraction. Thus, for a substantial distance into the filament layer, each filament is embedded or encased in the adhesive 4.

Although this leaves an outer portion of the filament layer (the portion facing away from the adhesive layer 4; facing upwardly in Figure 1) untouched by the adhesive 4 at any one point along the length of the tape, each filament as it extends along the tape is intermittently embedded or encased in the said adhesive 4. This is particularly true where, as here illustrated, the filaments are in the form of loosely twisted yarns. Any given filament is now on the side of the yarn that faces the adhesive layer 4, now on the side that faces away from the adhesive 4; now in or near the center of the yarn, now on or near the outside of the yarn. The same is true although sometimes to a lesser degree, of free filaments, that is, when the filaments are not in the form of yarns but are in the form of a layer of individual filaments. In such a layer, any given filament is sometimes in the center of the layer, sometimes on or near the top and sometimes on or near the bottom, as it extends along its course, bunched with the other filaments.

Thus the filaments are individually united to, encased or embedded in, and permanently bonded by, the adhesive 4, and the resulting structure has properties peculiar to the combination and not possessed by the individual components alone.

In the combination, a series of continuous mono-fiber hair-like filaments are clamped, as it were, by the permanently adherent adhesive 4 that is highly cohesive, and the result of this is to increase the effective tensile strength of the embedded yarns or free filaments. When thus embedded, their tensile strength is greater than the aggregate strength of an equal number of uncoated yarns or free filaments, yet the adhesive 4 alone has a low tensile strength. A layer of non-reinforced adhesive 4 may be quite easily pulled out between the fingers to the breaking point.

The adhesive 4 has elasticity and it is quite stretchy. Because of this property of the adhesive, together with the fact that it is permanently bonded to the filaments by virtue of its aggressive tackiness, the filaments are capable of movement relative to each other and relative to the backing without rupture of the bond between the adhesive 4 and the filaments, without rupture of the bond between the adhesive 4 and the paper layer, and without internal rupture of the adhesive 4. This is in direct contrast to prior tapes, wherein the adhesive has no stretch. If in such tapes, the stress and strain of use causes sufficient relative movement between a strand and the adhesive to break the strand loose from the adhesive, the adhesion between the two is never restored and the tape becomes weakened at that point. In the tape of the present invention, however, the adhesion between the filaments and the adhesive 4 is never broken, and the combinative effects are thus never lost. These factors also permit elongation of the yarns or free filaments when the tape is stressed, and of their retraction when the stress is decreased or removed. The normal elongation of glass filaments is only 3% at break, but the combinative effect of the present structure is such that they have an elongation of 6% when the finished tape is stretched to the breaking point of the embedded glass filaments or yarns.

A very important feature is that the present structure allows a relative shifting of the mono-fiber filaments so that when the tape is subjected to non-uniform stresses the load will be more effectively distributed as between the various filaments, thereby more nearly equalizing the strains on the yarns or free filaments and increasing the effective resistance of the tape to breaking. This is of particular value in obtaining a maximum resistance to severe shock stresses such as are produced, for example, when a bundle of steel rods is dropped on the floor and the adhesive tape straps are suddenly subjected to strong bursting forces which are non-uniform across the width and along the length of the tape.

The adhesive 4 also serves to absorb and damp such shock forces because of its yieldable and resilient nature, thereby further increasing the effective strength of the yarns or free filaments in respect to the shock stresses.

A further co-active effect is involved in respect to the backing. The paper sheet 1 is clamped to the layer of yarns or free filaments by the tacky, stretchable adhesive 4. When the tape is elongated under a lengthwise pull it is found that the paper can elongate to a greater extent before rupture than otherwise is the case. Moreover, if a paper is used which will break before the filaments break, the continuity of the tape and its lengthwise strength is retained since the filaments are the load-carrying elements.

The filaments do not adhere to rubber. A continuous man-made filament which is encased by rubber can be pulled out, being a smooth-surfaced cylinder held only by friction. This is in contrast to natural fibers. A yarn formed of twisted continuous mono-fiber hair-like glass filaments has only a limited degree of anchorage to rubber in which encased. In the present gummed strapping tape the yarns and filaments require no special treatment in order to be firmly bonded, owing to the fact that the rubber-resin type pressure-sensitive adhesive 4, unlike rubber per se, wets the fiber surfaces and has a strong specific adhesion to them. And as above pointed out, this adhesive bond is not broken by movement of the filaments inasmuch as the adhesive 4 is very stretchy. The wetting action of the adhesive also facilitates its penetration between the filaments so as thoroughly to contact their surfaces.

Since the yarns or filaments are aligned and run straight they are in a condition of maximum strength, unlike the undulating threads of woven cloth which cross over each other and bear into each other when a strong pulling force is applied. This also makes for greater lengthwise and crosswise flexibility, and there are no fiber ends exposed at the side edges of the tape. The yarns can be closer together than in woven cloth. These factors all contribute to making possible extremely strong adhesive strapping tapes having maximum flexibility and suppleness and minimum thickness.

The lengthwise tensile strength and crosswise tear strength of the tape are mainly due to the lineally aligned filaments embedded in the pressure-sensitive adhesive layer (i. e. to the filament-reinforced pressure-sensitive adhesive layer 4), whereas the crosswise tensile strength and lengthwise tear resistance are mainly due to the paper. The paper layer and the reinforced adhesive layer thus perform distinct functions in respect to strength properties. Crosswise tensile strength and lengthwise tear strength are of secondary importance for strapping purposes. The present construction avoids an unnecessary degree of crosswise tensile strength and lengthwise tear strength and thereby makes it possible to employ ordinary untreated paper for the backing.

Thus the laminate 1—4—8 (the paper 1, the adhesive layer 4 and the layer of filaments or yarns 8) provides a peculiar and useful combination of capacities and characteristics.

As previously described herein, the sizing layer 12 of normally tacky adhesive is applied to the side of the layer of filaments or yarns 8 that faces outwardly from the said laminate, so that the two adhesive layers 4 and 12 work toward each other, the adhesive 4 penetrating the filament layer from one side (the lower side in Figure 1) and the adhesive 12 penetrating the filament layer from the other side (the upper side in Figure 1). The filament layer is between the two tacky adhesive layers, embedded therein and unified therewith.

Inasmuch as a major factor in the production of the advantageous combinative properties possessed by the laminate 1—4—8 is seen from the explanations hereinabove set forth to be the clamping of the filaments by an adhesive that possesses the four-fold balance of adhesion, cohesion, stretch and elasticity (the adhesive 4), it will now be seen that the more closely the characteristics of the adhesive 12 equal those of the adhesive 4, the greater will be the degree to which the tape as a whole possesses the said advantageous combinative properties.

However, as previously indicated, the present invention teaches that the adhesive 12 need not be the same as the adhesive 4 in order to produce tape that attains the objectives. In fact, the adhesive 12 may be simply normally tacky, without stretchiness or elasticity; the laminate 1—4—8 will carry the load and fulfill the requirements. Nevertheless, although such tape has utility, the preferred form includes the use of an adhesive 12 that has, to a noticeable degree, the properties of stretch and elasticity together with adhesion for the filaments, the glue and the adhesive 4, and a cohesion at least as great as the adhesion.

The layer 12 further serves as a sizing layer. The glue layer adheres better to the adhesive 12 than to the bare filaments or yarns 8, and in use the tape is more resistant to delamination at that point. The normally tacky sizing layer 12 allows free movement of the filaments relative to the object to which the tape is adhered when in use.

It will be seen that the high tensile strength gummed tape of the present invention possesses the basic combinative performance characteristcis of the sandwich construction of high tensile strength gummed tape referred to in the introductory portion of this specification. Additionally, the present tape possesses certain advantages thereover.

Chief among these is the use of a single sheet of paper in the backing. The sandwich tape requires two.

This elimination of the inner sheet of paper has numerous advantages. One is cost reduction. Another is increased flexibility (largely for cost reasons, the paper is untreated and is consequently relatively stiff). A third is the more direct adhesive connection between the filament layer and the surface of a taped article, with no intervening paper sheet. A more highly unified combination is produced. A fourth is reduced caliper; the new tape is thinner.

Notwithstanding these and other advantages that result from the elimination of the inner paper sheet, such a step is not an obvious one; in fact, the idea of the application of a layer of glue directly to a layer of normally tacky adhesive, is quite startling.

The particular tape structure of the present invention has a peculiar and useful combination of capacities, characteristics and advantages which are not possessed by any prior tapes known to us.

As indicated by the name "strapping tape," it finds particular utility when used to accomplish the work of a band or strap to bind or tie bundles, cartons or packages.

Figure 3 illustrates such a use. When cardboard cartons are used to hold very heavy materials, metal bands are usually required to bind them. Such a non-adherent band must go around the entire carton in order to be fastened. Tapes made according to the present invention, however, have tensile strengths sufficient to enable them to replace such metal bands; and being gummed, can be adhered to the carton so that the tape need not encircle the carton, as must the metal band, thus being the cheaper both in respect to initial cost and quantity used. Additionally, metal bands tend to weaken the carton by cutting it at the corners, whereas the tape of this invention not only avoids such cutting and weakening but serves actually to reinforce and to strengthen the carton.

We claim:

A high tensile strength gummed filament tape of the character described comprising a sheet of paper, a layer of a rubber-resin type pressure-sensitive adhesive which is waterproof and is stably and normally tacky, a layer of a second normally tacky adhesive over the first layer of tacky adhesive, with a non-woven layer of lineally aligned continuous mono-fiber hair-like glass filaments between the two tacky adhesive layers, embedded therein and unified therewith, and a coating of a normally non-tacky adhesive on the exposed surface of the second normally tacky adhesive layer.

References Cited in the file of this patent

UNITED STATES PATENTS

| | | |
|---|---|---|
| 2,422,969 | Johns | June 24, 1947 |
| 2,438,195 | Tierney | Mar. 23, 1948 |
| 2,444,830 | Kellgren | July 6, 1948 |
| 2,561,781 | Bruce | July 24, 1951 |
| 2,631,947 | Kline | Mar. 17, 1953 |
| 2,674,556 | Pahl | Apr. 6, 1954 |